United States Patent [19]
Smith et al.

[11] Patent Number: 5,353,466
[45] Date of Patent: * Oct. 11, 1994

[54] REARVIEW MIRROR WIPER

[76] Inventors: Darrel L. Smith, 3435 NW. 155 St., Reddick, Fla. 32686; Donnie Knight, 4207 E. Louisiana Ave., Tampa, Fla. 33610

[*] Notice: The portion of the term of this patent subsequent to Jan. 19, 2010 has been disclaimed.

[21] Appl. No.: 966,284

[22] Filed: Oct. 26, 1992

Related U.S. Application Data

[63] Continuation-in-part of Ser. No. 802,316, Dec. 4, 1991, Pat. No. 5,179,758.

[51] Int. Cl.⁵ .................... B60S 1/56; B60S 1/20; B60S 1/44
[52] U.S. Cl. .................. 15/250.003; 15/250.29; 15/250.24; 15/250.12; 15/250.01; 318/DIG. 2; 74/89.22; 474/109; 248/481; 362/142; 359/876
[58] Field of Search ............ 15/250.003, 250.17, 15/250.30, 250.01, 250.29, 250.24, 250.12; 248/481; 362/142; 359/876; 318/DIG. 2; 74/89.2, 89.22, 506; 474/87, 101, 109, 148, 149, 64, 65

[56] References Cited

U.S. PATENT DOCUMENTS

| | | | |
|---|---|---|---|
| 1,035,796 | 8/1912 | Lamb et al. | 15/250.24 |
| 2,648,087 | 8/1953 | Kiker, Jr. | 15/250.24 |
| 2,814,823 | 12/1957 | Werner | 15/250.003 |
| 2,913,754 | 11/1959 | Vanderzee | 15/250.003 |
| 2,987,937 | 6/1961 | Sala | 74/89.22 |
| 3,522,584 | 8/1970 | Talbot | 15/250.003 |
| 4,699,478 | 10/1987 | Tsui et al. | 15/250.003 |
| 4,728,870 | 3/1988 | Hirano et al. | 15/250.17 |
| 4,957,014 | 9/1990 | Burke | 74/89.22 |
| 5,179,758 | 1/1993 | Smith et al. | 15/250.003 |
| 5,203,050 | 4/1993 | Han | 15/250.003 |

FOREIGN PATENT DOCUMENTS

| | | | |
|---|---|---|---|
| 1015830 | 8/1952 | France | 15/250.24 |

*Primary Examiner*—David A. Scherbel
*Assistant Examiner*—G. Graham
*Attorney, Agent, or Firm*—Peter H. Rehm

[57] ABSTRACT

A rearview mirror wiper system for use on a truck, bus, passenger car or similar vehicles. The basic system can be supplied as original equipment on a vehicle or as a replacement for a wiperless original equipment rearview mirror. The wiper system fits in any number of aesthetically pleasing enclosures that are harmonious with the overall vehicle design. It is further characterized by a low profile vertically oriented armless wiper assembly that wipes from side to side, an electric power control that regularly reverses polarity, and an assembly of pulleys and a cable that imparts motion to a wiper blade. At each end of the wiper blade's range of travel is a switch that cuts off electric power until the power control changes polarity. If two rearview mirror wipers are installed on one vehicle, a common power control assures the left and right wiper motions are synchronized.

15 Claims, 11 Drawing Sheets

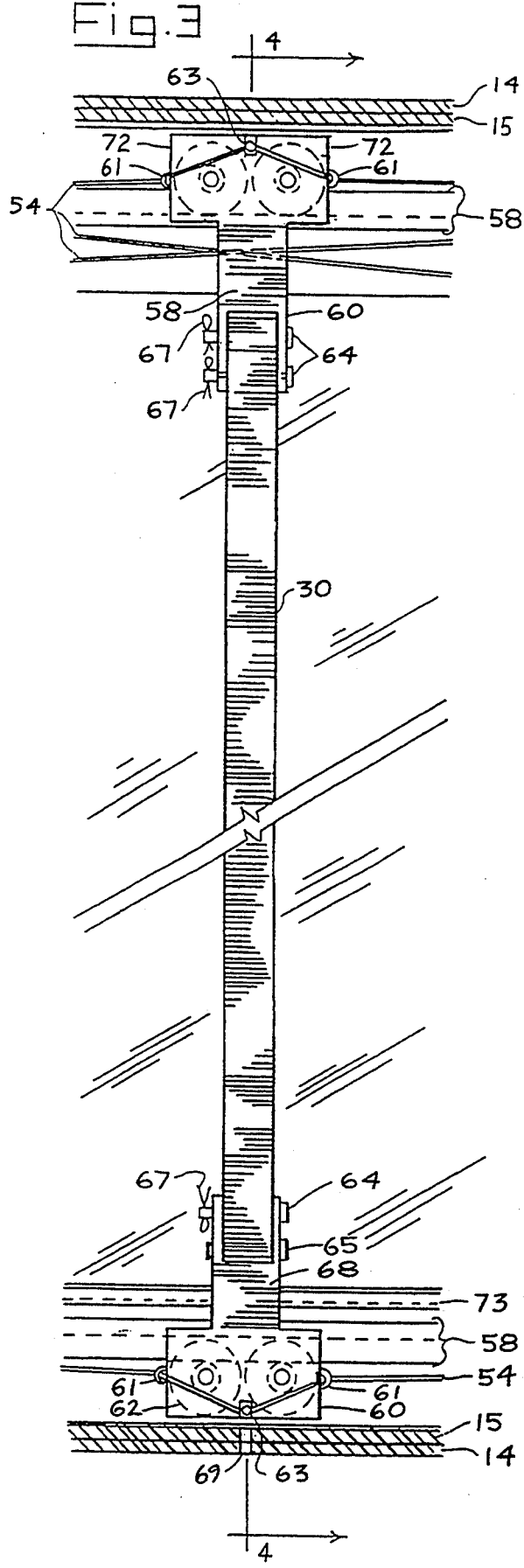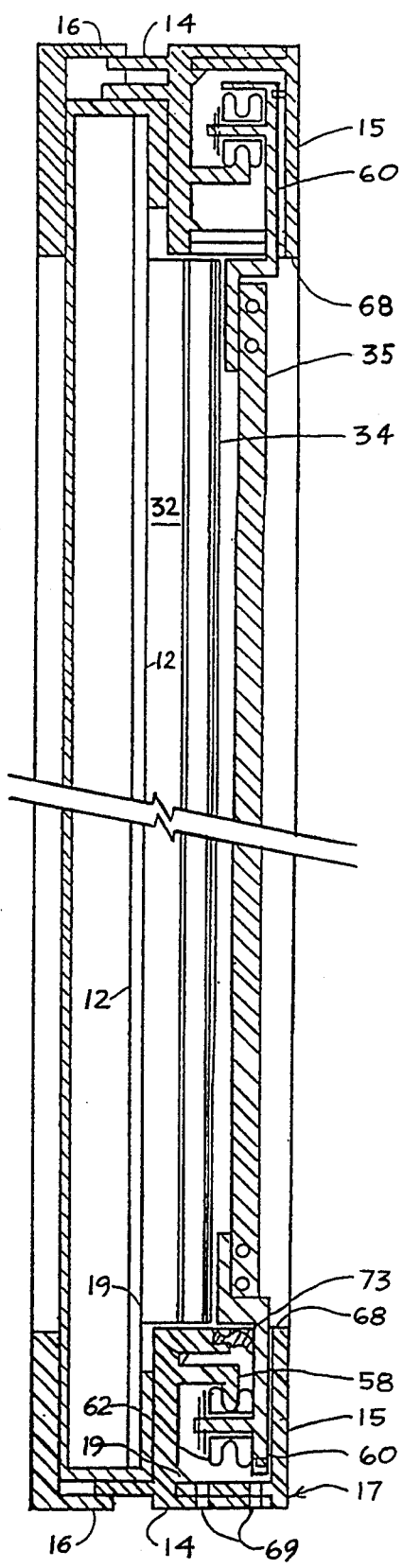

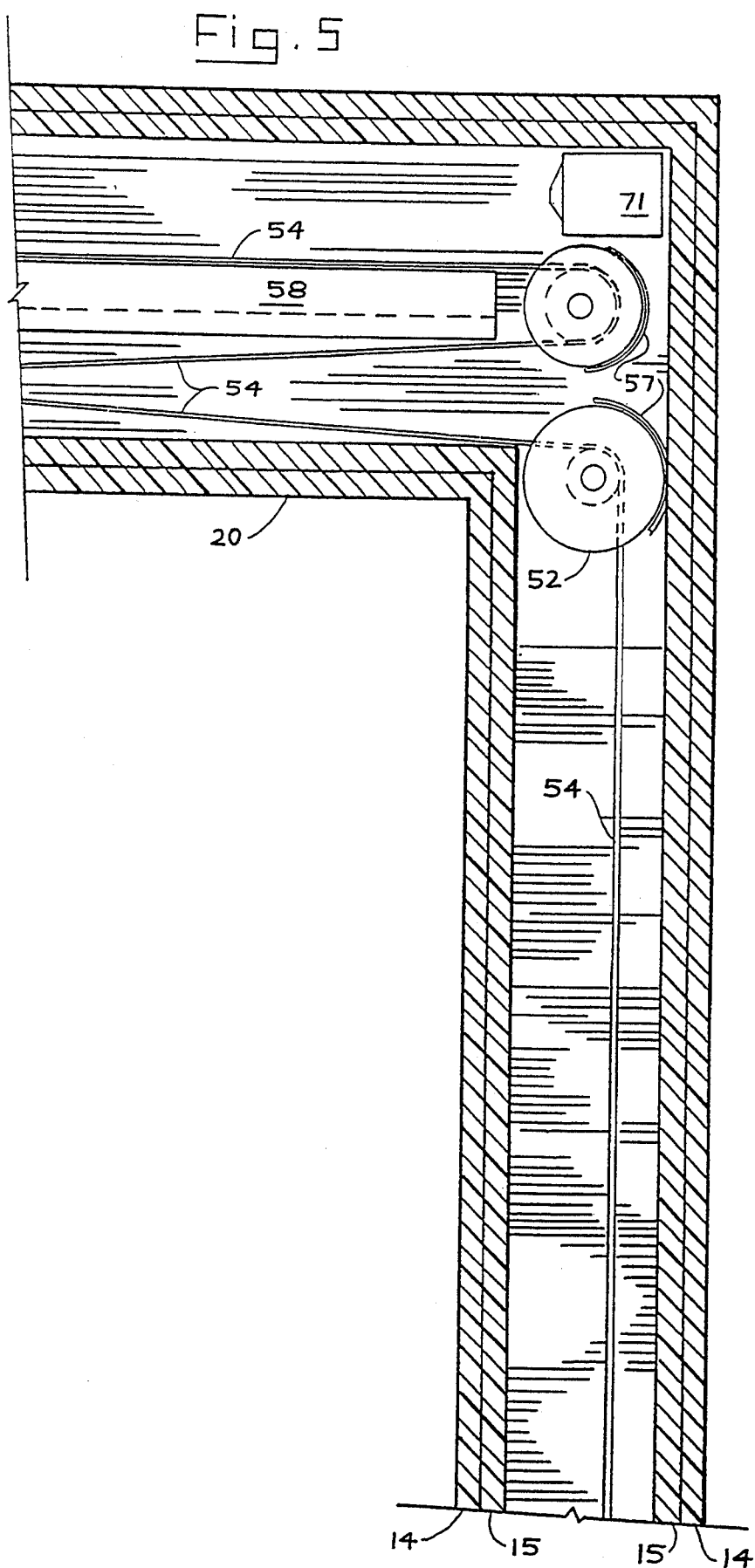

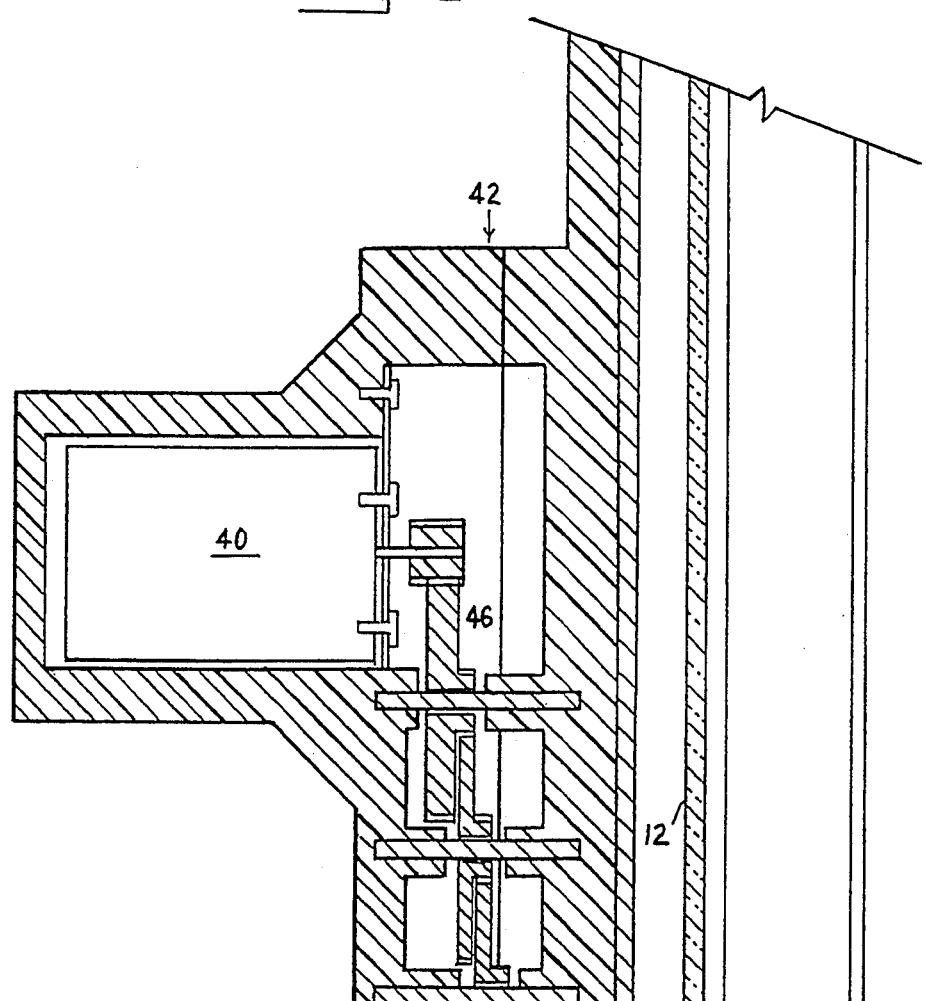
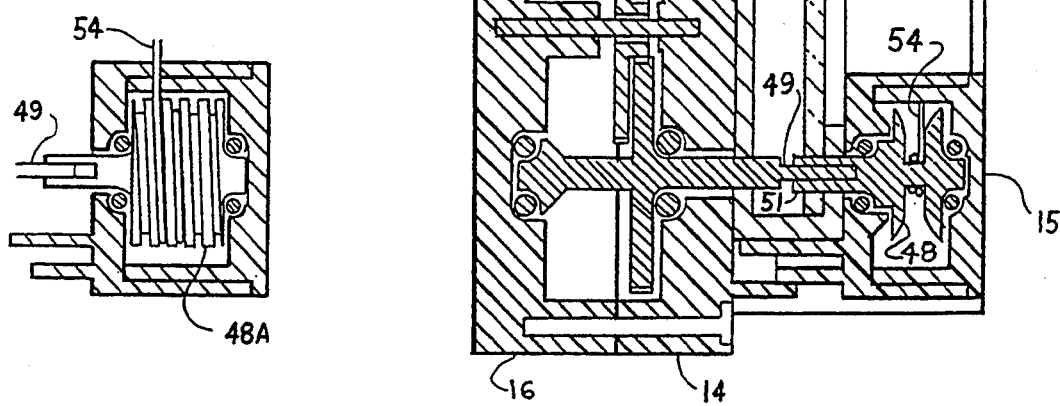

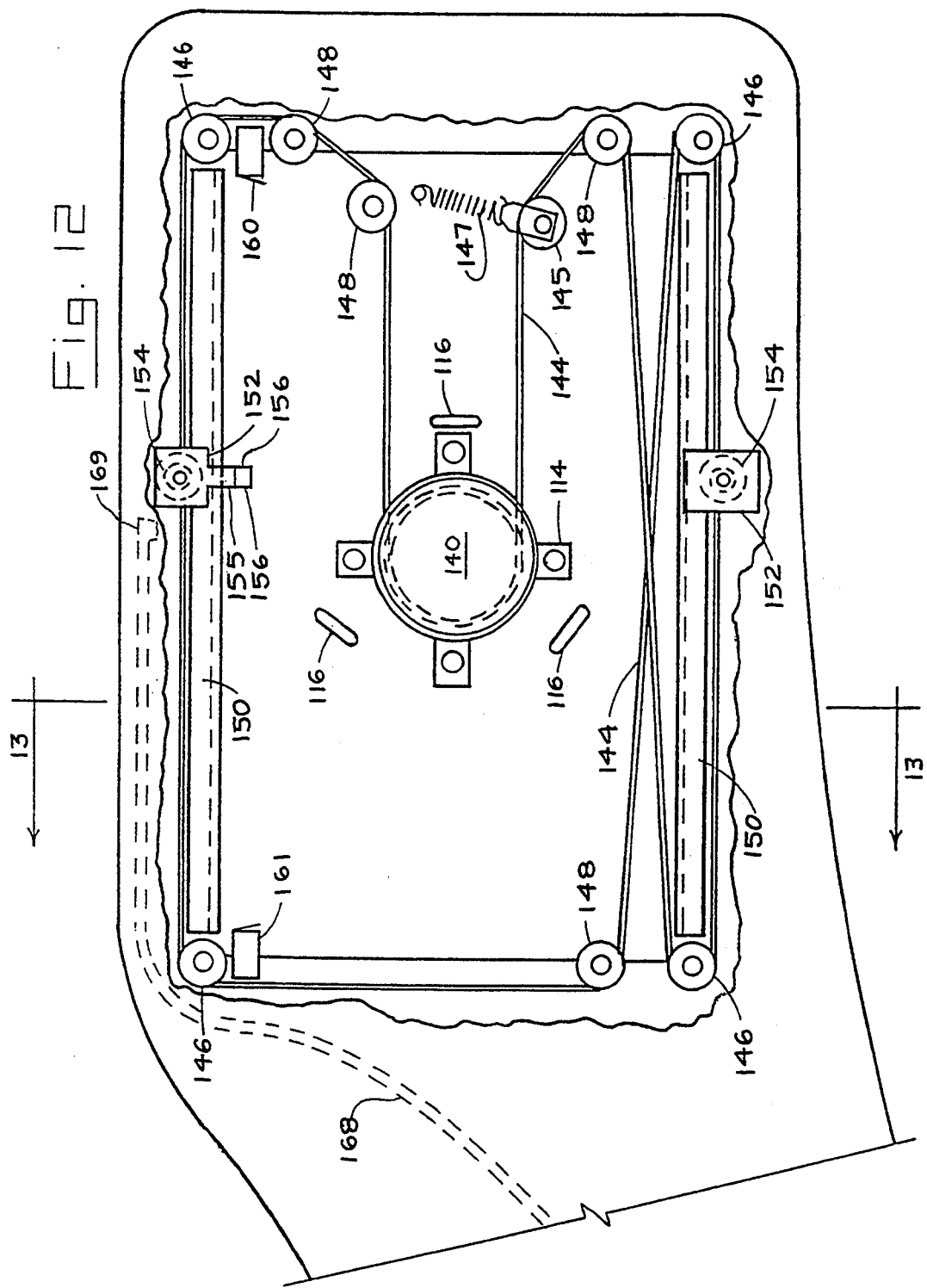

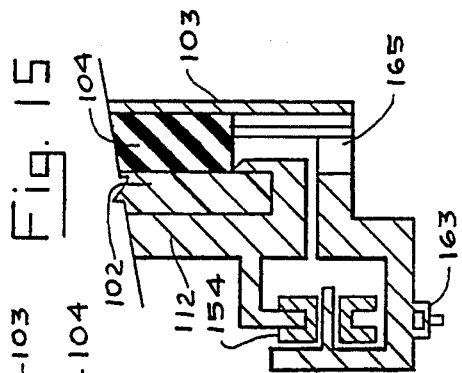
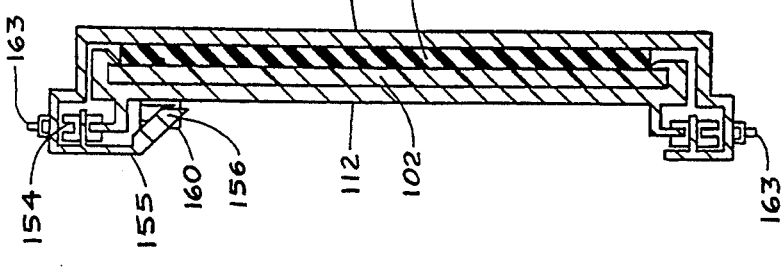
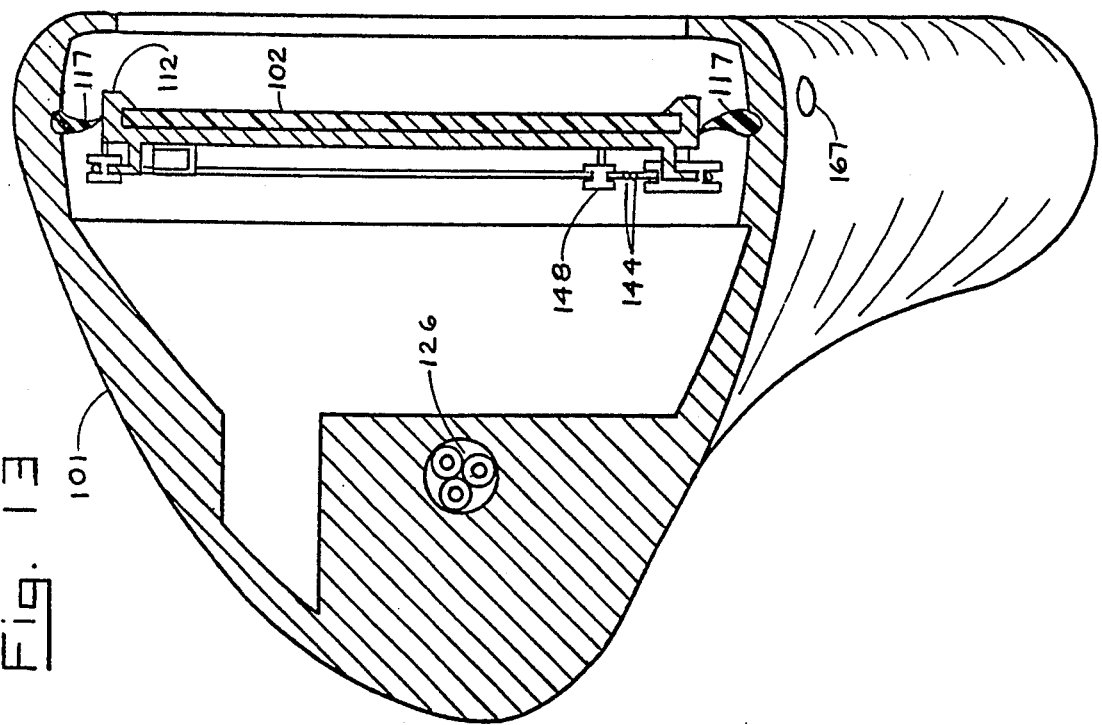

REARVIEW MIRROR WIPER

This is a continuation-in-part of Ser. No. 802,316, filed Dec. 4, 1991, now U.S. Pat. No. 5,179,758.

BACKGROUND OF THE INVENTION

This invention relates generally to wiping and specifically to wiping of the external rearview mirrors of vehicles.

The use of wipers on the rearview mirrors of vehicles is a potential trend. Because of the length of trucks and busses, it is especially important that they have an excellent view of what is beside them. Unfortunately, heavy rainfall can obscure the view in a standard rearview mirror. Even a heated mirror does not help in heavy rainfall. If a dangerous circumstance suddenly presents itself in a vehicle's path, the driver might not be able to tell whether it is safe to change lanes left or right to avoid the danger. Therefore, having clean mirrors can prevent accidents and save lives.

Many patents have issued on various inventions related to wiping of rearview mirrors. Yet it is still a rare sight to see a vehicle equipped with any of these inventions. In the absence of regulations mandating wipers on the external rearview mirrors of large commercial vehicles or automobiles, the popularity and commercial success of such wipers can be expected to be highly sensitive to both price and aesthetics. Aesthetics in a rearview mirror wiper is particularly important for passenger cars.

OBJECTS AND SUMMARY OF THE INVENTION

An object of the invention is to provide an external rearview mirror wiping system that is unobtrusive enough to be provided as original equipment on a vehicle. Thus, it should fit in an aesthetically pleasing enclosure that is consistent with the overall design of the vehicle body. It is also an object of the invention to provide a rearview mirror wiper system that replace wiperless original equipment rearview mirrors.

Another object is to minimize driver distraction caused by operation of the rearview mirror wiper system. Another object is that the driver be able to adjust the position of the wiping rearview mirror in the same manner as an ordinary mirror for the particular type of vehicle involved.

These and other objects of the invention are fulfilled by providing an exterior rearview mirror with a built-in wiper all in an enclosure custom designed for the type of vehicle it was made for. Near two opposite edges of the mirror are a parallel pair of runner tracks on which a pair of runner assemblies slide. The two runner assemblies movably hold the ends of a wiper blade and keep it pressed against the mirror. The two runner assemblies and a rigid part of the wiper blade may be several distinct pieces or one piece. The runner assemblies are attached to a cable loop. The cable is looped around several pulleys in such a way as to make the runner assemblies slide synchronously back and forth. The cable is driven back and forth by a motor. The motor is powered by an electric power control that regularly changes polarity. This special power control is usually located inside the vehicle, apart from either side mirror. The wiper accessory has a switch signaling the presence of the wiper at each end of its range of travel. When the wiper actuates one of these switches, it cuts off power to prevent further travel outside the desired range. Driver distraction is minimized by using a single power control to synchronize the motion of left and right mirror wipers. The rearview mirror and built-in wiper pivot to allow the driver to adjust the mirror's position in a manner that is typical for each type of vehicle.

BRIEF DESCRIPTION OF THE DRAWINGS

FIG. 3 is a detailed sectional front view of the runner assemblies as attached to the frame and the wiper assembly.

FIG. 4 is a sectional side view of the wiper assembly taken along the line 4—4 in FIG. 3.

FIG. 5 is a detailed sectional view of the upper right hand corner of rearview mirror wiper.

FIG. 6 is a sectional side view of the drive motor, gear train, and drive pulley of the rearview mirror wiper of FIG. 1.

FIGS. 7 and 8 are respectively first and second alternatives to the drive pulley shown in FIG. 6.

FIG. 12 is rear cut-away view showing the internal parts of the embodiment of FIG. 10.

FIG. 13 is a sectional view taken along the line 13—13 in FIG. 11.

FIG. 14 is a sectional view of only the mirror and wiper taken along the line 14—14 in FIG. 11.

FIG. 15 is an enlargement of only the lower portion of FIG. 14.

DESCRIPTION OF THE PREFERRED EMBODIMENTS

Figure 1:
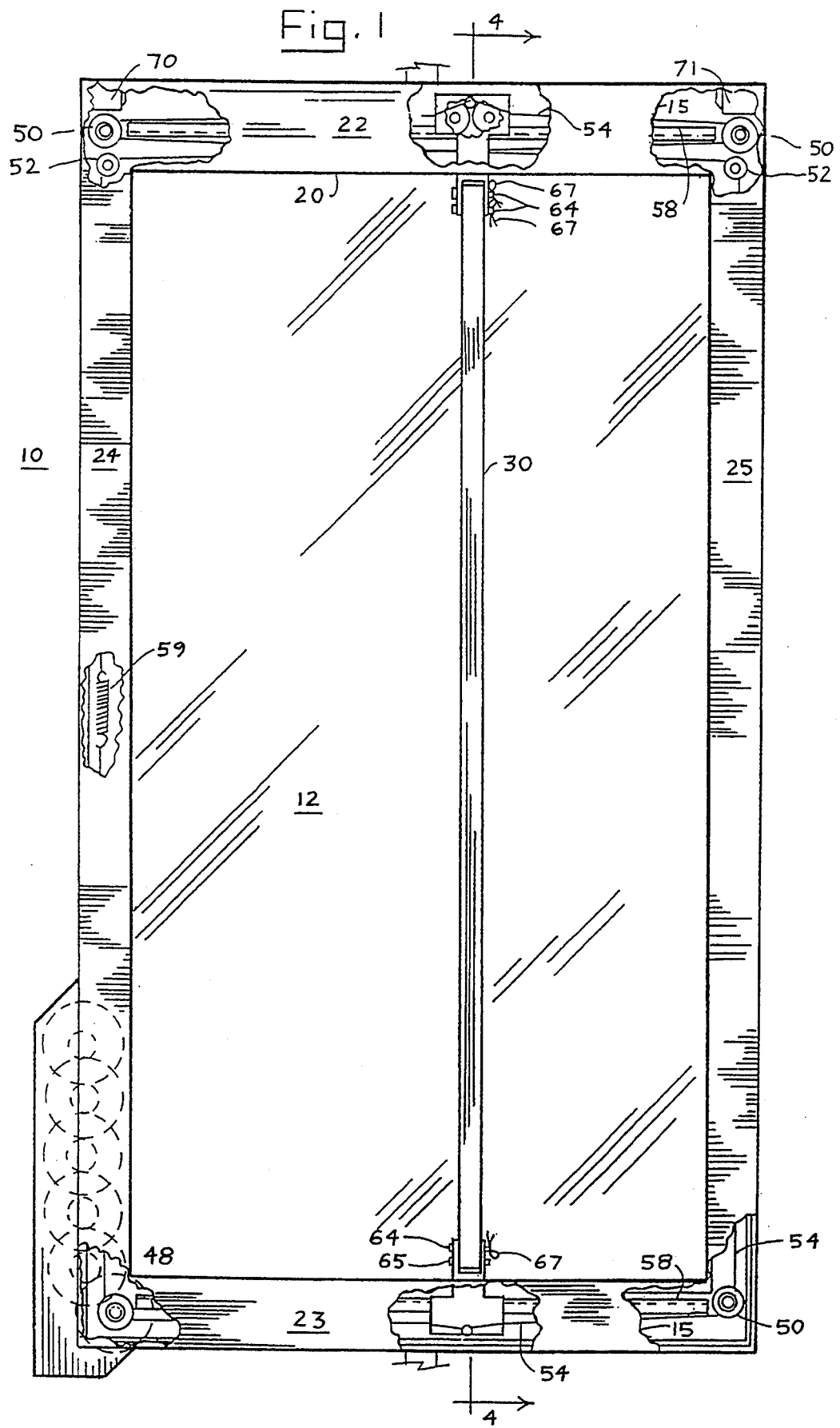
FIG. 1 is a front view of an embodiment of the rearview mirror wiper as provided for and mounted on a large truck or bus.
Figure 2:
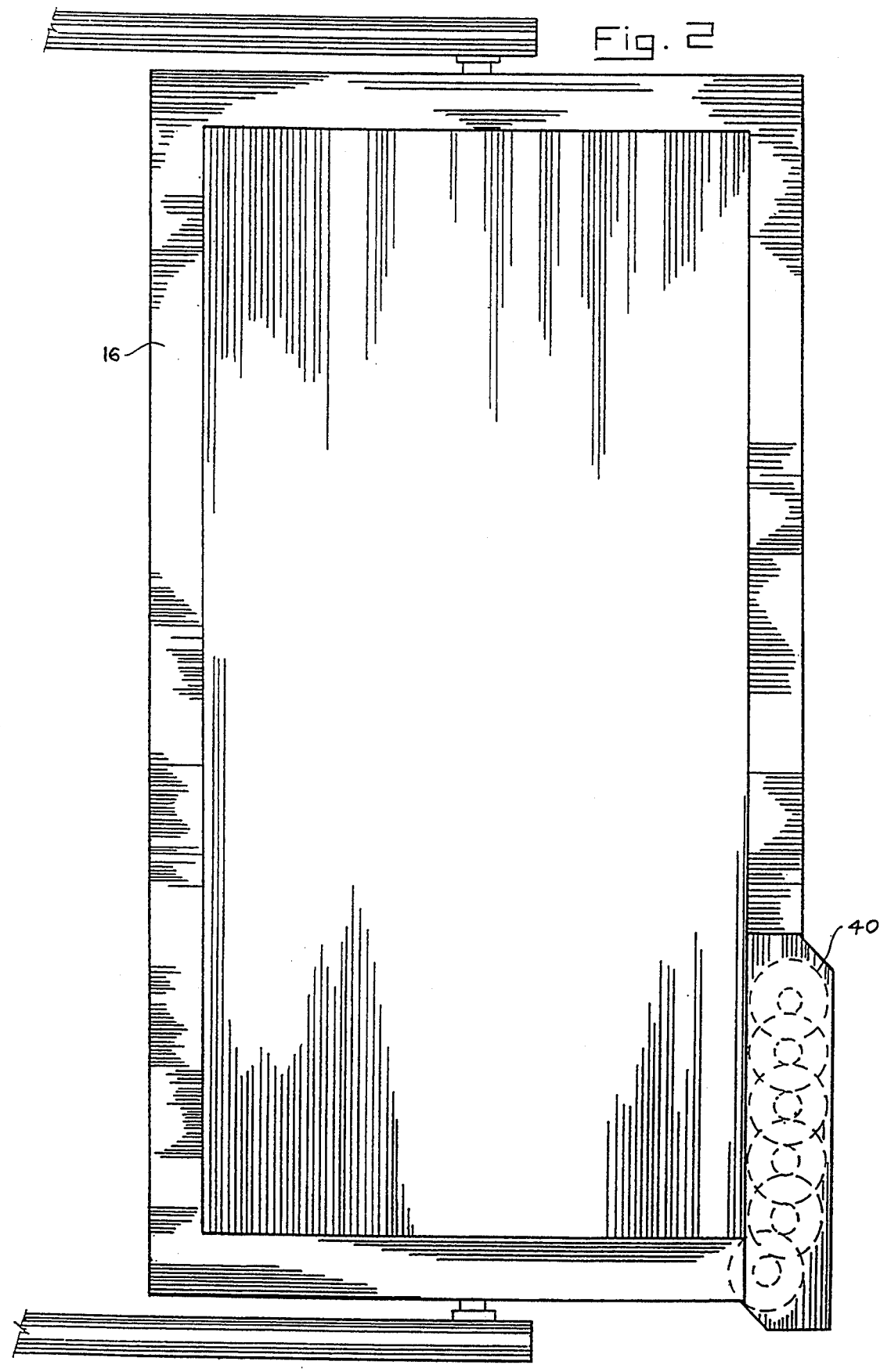
FIG. 2 is a back view of the rearview mirror wiper of FIG. 1.

Reference is made to FIG. 1 showing a rearview mirror wiper unit 10 adapted for a typical truck or bus. The unit 10 has a frame 14 with a front cover 15 and back cover 16 (FIG. 2). The front cover 15 and frame 14 are sealed at their parallel walls 17, which are held together by a rim 19 extending all around the frame 14. The frame 14 and back 16 hold the mirror 12 between them. The assembled wiper accessory 10 has a top side member 22, bottom side member 23, left side member 24, and right side member 25.

Wiping action is achieved by a motor 40, a system of gears 46, six pulleys 48/50/52 and a cable 54. As shown in FIG. 6, the motor 40 and a weatherproof gear box 42 are located behind the mirror. The gears 46 in gear box 42 reduce the rotational velocity of the motor 40 from high speed at the motor 40 to much slower at the drive pulley 48. The accompanying increase in torque allows a common, inexpensive, and relatively weak (but fast) DC motor to drive the wiper. The cable can be wrapped around the drive pulley 48 to increase its grip through friction. The drive pulley 48 is removably coupled to gear train 46 by a square peg 49 and socket 51.

Figure 8:
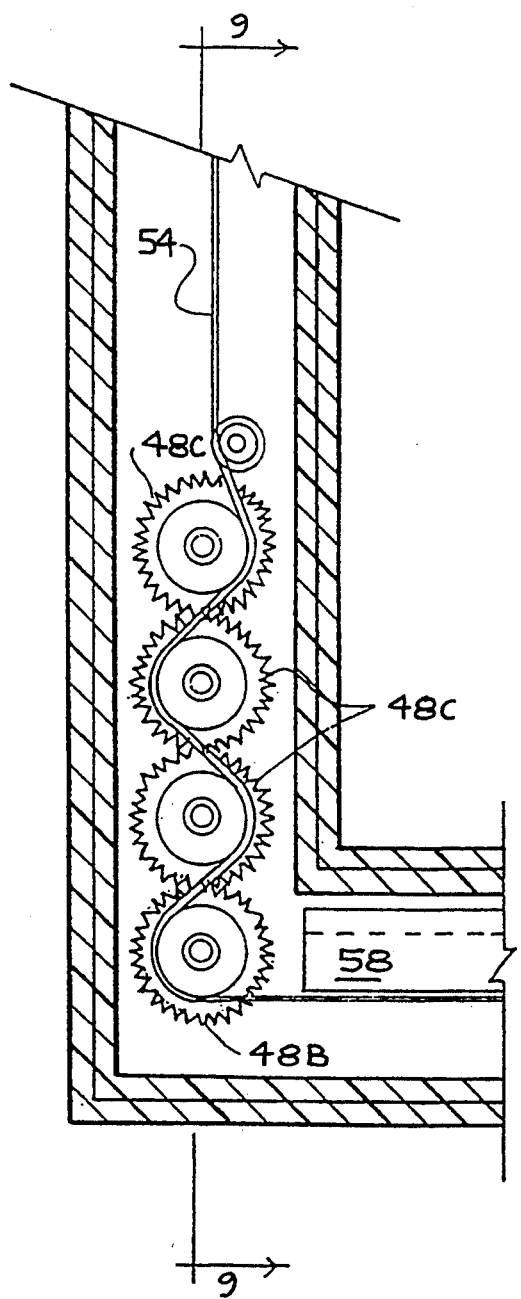
Figure 9:
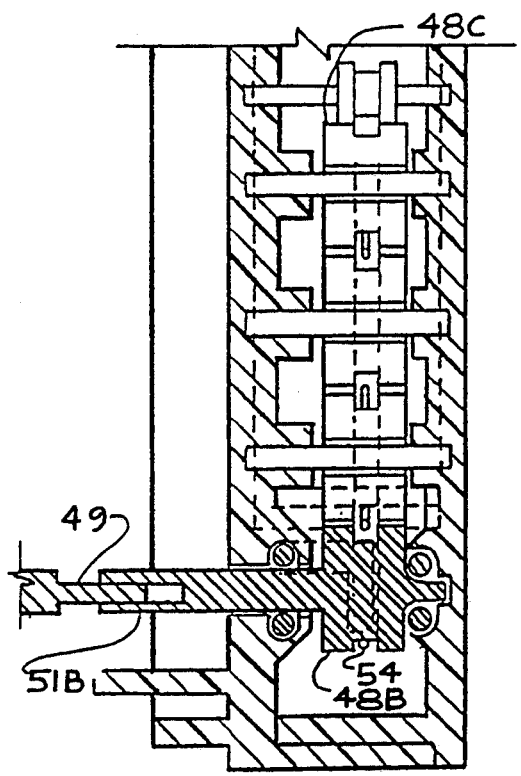
FIG. 9 is a sectional view taken along the line 9—9 in FIG. 8.

FIG. 7 shows a first alternative drive pulley 48A that may be used instead of drive pulley 48. The screw shaped slot of the alternative drive pulley 48A guides the cable 54 and helps prevent tangles. FIGS. 8 and 9 show two views of a second alternative drive pulley arrangement. A direct drive pulley with spur gear 48B has a square socket 51B by which it is connected to square peg 49 on the slow side of the gear train 46. This spur gear 48B also drives several follower spur gear drive pulleys 48C. The multiple drive pulleys 48B/48C contribute to the friction or grip on cable 54 without compromising its ability to slip when necessary to prevent damage. The drive mechanism of FIGS. 8 and 9 is flatter than the screw shaped slotted drive pulley 48A of FIG. 7 and provides enough friction without tangles. Nevertheless, the drive pulley 48A of FIG. 7 is most preferred.

An elongated flexible member such as a cable 54 is strung among the pulleys as shown. The cable 54 is urged to move back and forth along its length synchronously with the rotation of drive pulley 48. The means of urging can be any of the mechanisms shown in FIGS. 6-9. It also can be one or more pulleys that are not at a corner.

The cable 54 is threaded around six pulleys 48/50/52 as best shown in FIG. 1. The four corner pulleys 48/50 align the cable with the runner tracks 58 and are therefore more specifically called runner pulleys 48/50. Each runner track 58 has a pair of runner pulleys 48/50 associated with it, one runner pulley at each opposite end of the runner track 58. The portion of the cable 54 between each pair of runner pulleys 48/50 is kept substantially parallel to the associated runner track 58.

Between the two pairs of runner pulleys 48/50, the cable 54 crosses itself so the two runner assemblies 60 travel synchronously back and forth. The remaining two pulleys 52 cause the cable 54 to cross outside the mirror's 12 field of view, a feature necessary only if the cable would otherwise tend to cross in front of the mirror. The exact position of these additional pulleys 52 is not critical, but to prevent the cable from rubbing itself at the crossover point the four pulleys in the top side member should not all lie in the same plane. Preferably, one of the additional pulleys is slightly above and one is slightly below the plane defined by the four runner pulleys.

The groove in each pulley 48/50/52 is deep enough to contain the cable 54. Each pulley 48/50/52 also has a curved guard 57 (FIG. 5) to prevent the cable 54 from popping out. The cable is kept under tension by some means such as a tension arm or spring. Preferably, for a long wiper with a short sweep, this is a tension regulating spring 59 that interrupts the cable at a point that doesn't ever encounter a pulley, as shown in FIG. 1. Sometimes no such point exists, as in a wiper assembly that wipes a distance greater than the length of the wiper itself. In this case it would be better to have a pulley on a spring loaded tension arm bear against the cable. In any case, the drive pulley 48 must grip the cable 54 during normal operation.

Each end of the wiper assembly 30 requires some means of being movably held to the runner track. In this embodiment, a pair of oppositely facing runner assemblies 60 serve as movable mounts for the wiper assembly 30. The runner assemblies 60 slide or roll along runner tracks 58 with the movements of the cable 54, taking the wiper assembly 30 with them. The runner assemblies' position relative to one another keeps the wiper assembly 30 parallel to the sides of the mirror 12. For a rectangular mirror they are directly opposite one another. Each runner assembly 60 has a pair of flanged wheels 62 that ride on a runner track 58 to reduce friction and increase stability. The wheels also help hold the wiper assembly 30 at a suitable angle.

The cable 54 is threaded through hooks or loops 61 on the outside of each side of the runner assembly 60, close to the runner track 58. The cable 54 is guided around the runner assembly 60 along a path that keeps it clear of the flanged wheels 62. A clamping screw 63 locks the cable in place so it does not slip relative to the runner assembly 60.

The part of the runner assembly 60 having the flanged wheels 62 is located deep inside a space between the frame 14 and the front cover 15. This space is protected from water by a strip of flexible weather stripping 73. One edge of the weather stripping 73 is permanently mounted to the frame 14 and the opposite edge presses against the front piece 15. The runner assemblies 60 have a thin, flat area 68 between the flanged wheels 62 and the connection to the wiper assembly 30. This flat area 68 passes between the flexible weather stripping 73 and the front piece 15 with minimal leaks. The bottom of the bottom side member 23 has drainage holes 69 for draining any water that does leak through. The weather stripping 73 is flexible and durable enough to allow the runner assembly 60 to slide back and forth repeatedly.

The wiper assembly 30 is attached to the runner assemblies 60 by a few removable pins 64 and a rivet 65 at the very bottom. When all pins 64 are removed, the wiper assembly pivots around the rivet 65. This provides access to the flexible wiper blade 32 or squeegee and its rigid backing 34 so the squeegee can be removed and replaced. The pins 64 are held in place by cotter pins 67 or the like. The whole wiper assembly should be narrow and low enough in profile to be unobtrusive to the driver's view.

One advantage of having the wiper assembly 30 mounted vertically, as shown, is that gravity will cause rainwater to run down the length of the squeegee. The water automatically gets out of the way. Optionally, at the bottom of the wiper assembly 30 is a water runoff guide (not shown) that guides the water away from small gaps in the weather stripping 73 that must necessarily form to each side of the flat part 68 of the runner assemblies 60. The invention could also be provided with a horizontal squeegee that moves up and down. However, in heavy rainfall, large amounts of water can build up on the top portion of an upward-bound squeegee. Some excess water may spill over the front of the squeegee. Turbulent air flow or wind can drive the spilled water against the mirror just under the squeegee, where it may again obscure the driver's view.

Another advantage of a vertical wiper assembly is that when it block one eye's view, the other eye can often see around it. In contrast, a horizontal wiper blocks both eyes simultaneously, creating a moving blind spot. In critical traffic situations, the driver cannot wait for a horizontal wiper to move out of the way.

The wiper motor 40 is a bidirectional direct current motor. It is powered by a direct current electric power control that periodically changes polarity. Each change in polarity causes a change in the direction of the wiper's motion and begins a new half cycle. Every other change in polarity begins a new cycle. The driver controls the duration of time between half cycles with a multi-position frequency control 92.

The wiper travels between two opposing extreme positions along the mirror. A pair of normally-closed momentary switches 70/71 are located at opposite ends of a runner track 58 so that one of these switches 70/71 is actuated when the wiper 30 reaches each end of its desired range of travel. Actuating each switch 70/71 opens the circuit that powers the motor's rotation in one direction only. This causes the wiper 30 to stop until the beginning of the next half cycle when the polarity of electricity to the motor 40 is reversed. If each half cycle is of short duration, the switches 70/71 will normally not be reached during continuous operation. Nevertheless, they serve as a safety catch that protects the gears 46 and other parts of the invention. As the power control is set to longer durations (lower frequencies) each switch 70/71 will be actuated once per full cycle and the wiping will become intermittent. Thus the presence of the wiper at each of two opposing extreme positions along the mirror is signaled and further travel in that direction is stopped. Every half cycle the wiper's position is automatically synchronized with the power control.

The upper runner assembly 60 has two switch actuating surfaces 72. These surfaces 72 are shaped and positioned to touch the switches 70/71 to actuate them at the proper positions of the wiper. The exact locations of the switches are factoryset.

When practical, it is preferred that a gear train be used with the motor. Nevertheless, various other means of reducing the rotational velocity and increasing torque of a motor are well known. Many of these could substitute for the gear train with substantially equal results. To keep motor costs down, velocity reduction means external to the motor is preferred over a low speed motor.

An important feature of the invention is that it can be adapted to the body designs and needs of many different vehicles. It is not limited to rearview mirrors of particular dimensions or shapes. In smaller embodiments some unessential parts may be omitted or modified, as will be shown below. Even though dimensions and such other things vary, the novel structures of the current invention and how they cooperate remains essentially the same.

While the invention is not in use, it permits an unobstructed view. The wiper can be hidden in what appears to be a standard rearview mirror enclosure. Only during operation must it reveal what it is. The invention has no unusual parts that stick out, even during operation. This is important because aesthetics plays an important role in the design and sale of most vehicles, especially passenger cars.

Figure 10:
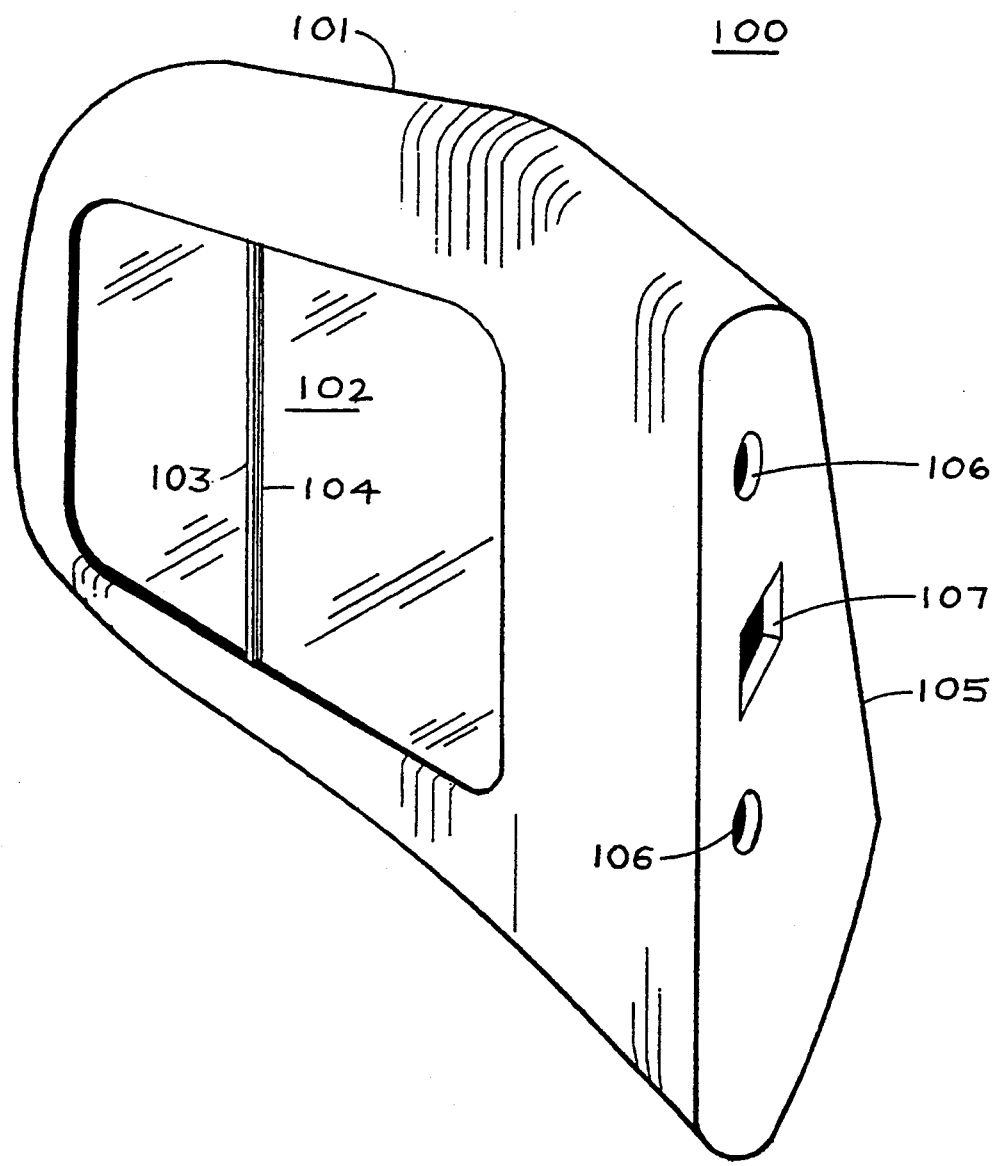
FIG. 10 is a perspective view of a second embodiment of the rearview mirror wiper invention, this one provided as original equipment on a passenger car.
Figure 11:
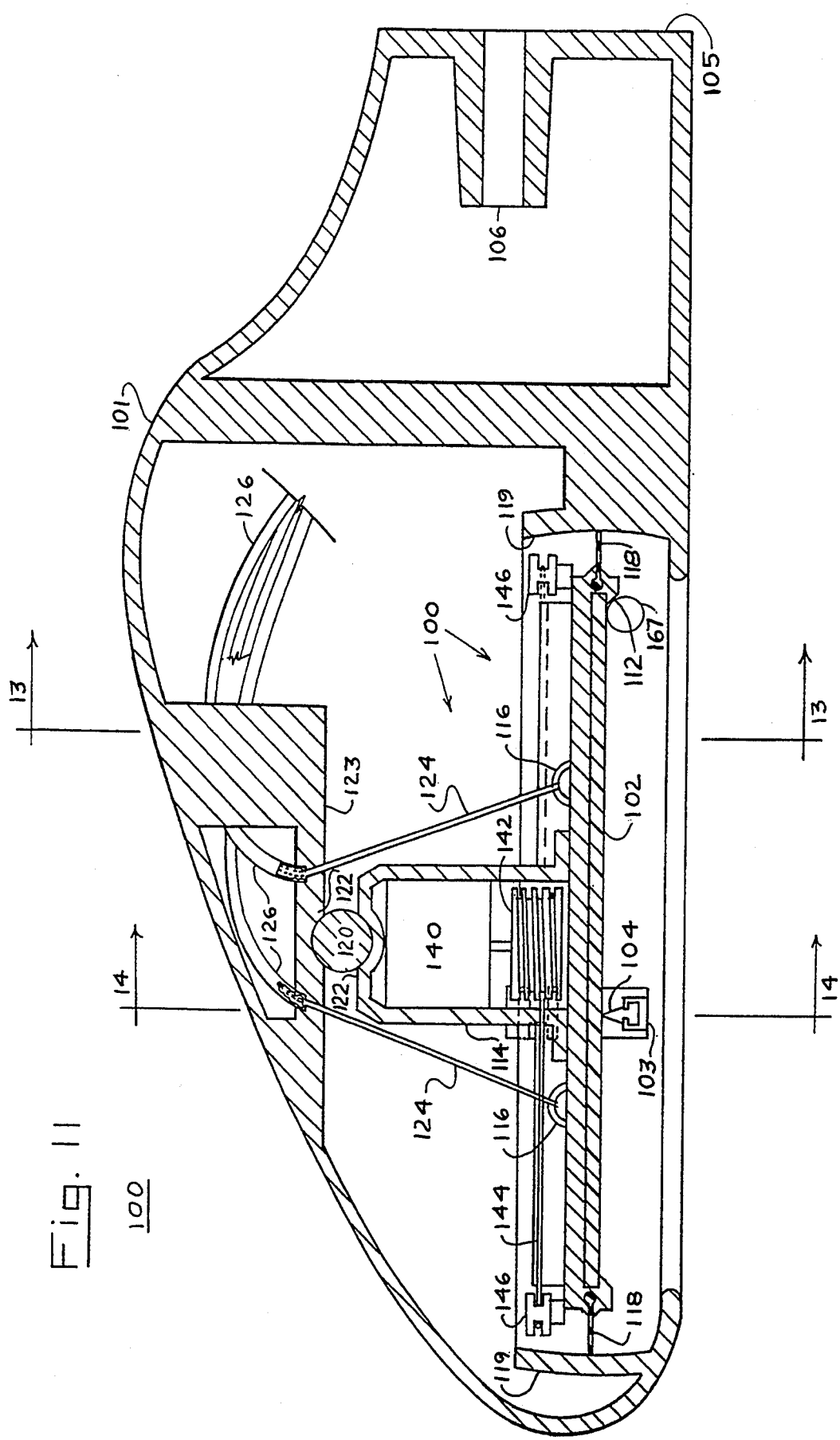
FIG. 11 is a horizontal section of the embodiment of FIG. 10, looking down.

FIGS. 10-15 show another preferred embodiment of a rearview mirror wiper unit, this time for a passenger car. FIG. 10 shows the rearview mirror wiper 100 in an enclosure 101 for the left side of the passenger car. The mirror 102 is substantially rectangular, but it may have rounded corners or other irregularities that do not interfere with the wiper. The enclosure 101 has a substantially rectangular opening exposing the mirror. As a matter of design, the opening may have rounded corners.

The enclosure 101 is mounted to the vehicle by mounting holes 106. A hole 107 in the wall 105 of the enclosure 101 provides passage for wires and cables. The right side of the vehicle can be fit with a similar rearview mirror, which is shaped as a "mirror image" of the left side.

FIGS. 11-15 shows the mechanical internals of the automotive embodiment of a rearview mirror wiper 100. Preferably, the mirror 102 is held by a mirror holder 112, which very loosely corresponds to the frame 14 in the truck embodiment, above. At least both play a roll in mounting the mirror to the vehicle. Several other items are mounted on the mirror holder 112, including a bracket 114, adjustment cable mounts 116, and weather stripping 118. These are part of a pivot-adjustable mirror assembly 110. This assembly 110 pivots about a ball 120 and socket 122 arrangement in two dimensions. The mirror assembly 110 is pressed against the ball 120 and socket 122 by tension in several cables 124.

These cables 124 double as adjustment cables 124 because they also set and hold the assembly's position as desired by the driver. The adjustment cables 124 are each mounted to one of the adjustment cable mounts 116 on the back of the mirror holder 112. Most of the length of the adjustment cables 124 are inside flexible fixed-length tubes or sleeves 126. One end of each of these sleeves 126 is mounted to a non-pivoting structure 123 on the inside wall of the enclosure 101. The other ends of the adjustment cables 124 are connected to an adjustment knob (not shown) that is operable remotely by the driver inside the vehicle. Such adjustment devices are well known in the art. Many passenger cars have electrically adjustable mirrors. The invention is compatible with them also.

The left and right sides of the mirror assembly 110 are extended by weather stripping 118 that presses against the curved inner surface 119 of the enclosure 101 opening. The top and bottom of the enclosure 101 opening likewise are extended by weather stripping 117 that presses against the mirror assembly 110 and allows the wiper backing 103 to slide by. A drainage hole 167 at the bottom of the enclosure 101 drains away any water that manages to get in.

A slow speed or internally geared down wiper motor 140 drives a drive pulley 142 and cable 144. The screw shaped slot drive pulley 142 is preferred in this embodiment, but the other kinds of drive pulleys would work also.

FIG. 12 shows the location of the two pairs of runner pulleys 146 and additional pulleys 148 and how the cable 144 is looped around them. A pair of runner tracks 150 is located near two opposite edges of the mirror 102, preferably the top and bottom edges as shown. The pulleys 146/148 are arranged to provide movement of the cable 144 parallel to and near each of two runner tracks 150. In this embodiment, the preferred location of the cable 144 loop is behind the mirror 102. Tension is applied to the cable 144 by a movable idler pulley 145 pulled by a spring 147.

A pair of runner assemblies 152 are mounted to the cable 144, one near each runner track 150. The arrangement of the cable 144 causes the runner assemblies 152 to move synchronously back and forth along the runner track 150 with the cable 144. The cable 144 can be mounted on the runner assembly 152 in any secure way that prevents it from slipping or coming off, such as with a cable clamp 163. A flanged wheel 154 in each runner assembly 152 rides on one of the runner tracks 150. To save space in this smaller embodiment, each runner assembly 152 preferably has one flanged wheel 154 instead of two. If necessary, even more space could be saved by omitting the flanged wheels altogether, letting the runner assembly slide instead of roll on the runner tracks 150.

FIG. 14 shows that one runner assembly 152 has an arm 155 with two switch actuating surfaces 156 extending down behind the mirror 102 and mirror holder 112. Each switch actuating surface 156 on this arm 155 actuates one of the normally closed switches 160 near each end of the runner track 150 (top).

The wiper assembly includes a rigid backing 103 and a flexible wiper blade 104 or squeegee. The rigid backing has a longitudinal slot in which the squeegee 104 is held and in which it can slide when manipulated to do so. When the wiper system is off, the wiper assembly parks itself over the drainage hole 167. This hole is large enough to allow the flexible wiper blade 104 or squeegee part of the wiper assembly to pass through it for removal and replacement. The point at which the lower runner assembly 152 meets the rigid backing 103 also has a hole 165 large enough for the squeegee 104 to slide through, as shown only in FIG. 15.

Because the flexible wiper blade 104 or squeegee can be replaced without separating the rigid backing 103 from the two runner assemblies 152, the rigid backing 103 and two runner assemblies 152 can be one piece of material, as shown. The rigid backing therefore extends into and becomes an integral part of the wiper assembly. The important thing is that each end of the wiper assembly has some means of being movably held to the runner tracks 150. The small size of this embodiment makes a wiper backing 103 with integral runner assemblies 152 preferable.

The mirror wiper system optionally includes a cleaning fluid tube 168 and nozzle 169. The tube 168 taps off the window washer fluid system already present under the hood of most vehicles. The driver sprays the mirror whenever desired. At the manufacture's option, the windshield washer control can activate the rearview mirror spray also. This eliminates the need for separate pump and controls. Otherwise, separate pump and controls can be provided.

Figure 16:
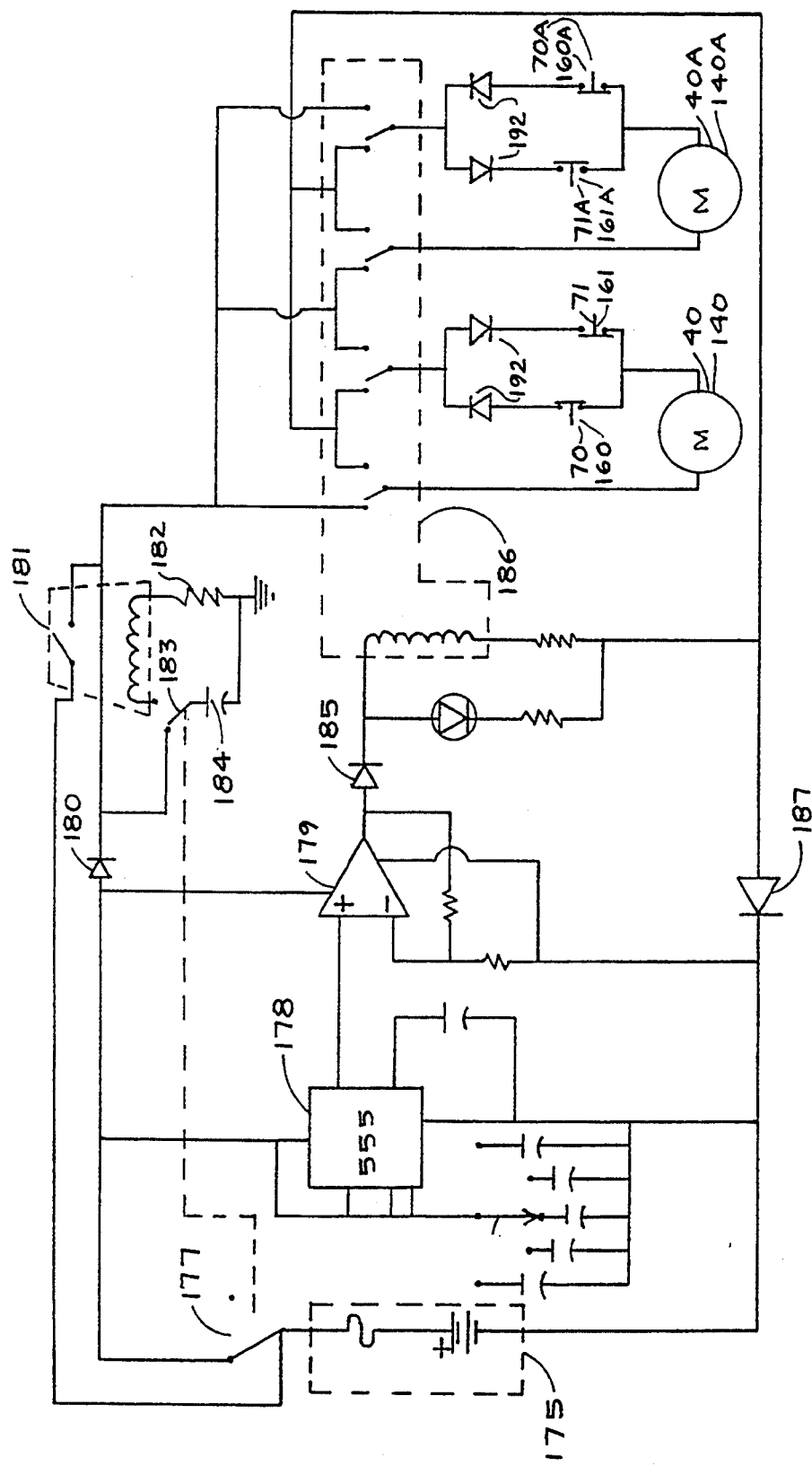
FIG. 16 is an electrical schematic of the power supply & power control for the rearview mirror wiper invention.

FIG. 16 is an electric schematic diagram of the preferred embodiment of the power control 170. The power control 170 is essential to the invention because it participates in the control of the wiper. The power control 170 obtains its power from a fused vehicle power supply 175, typically twelve volts. As shown, it can supply power to and control up to two rearview mirror wipers 10 or 100, but one wiper accessory 10 or 100 is sufficient to practice the invention. The heart of the power control 170 is an oscillator circuit 178. This oscillator circuit 178 must have or preferably be amplified to have sufficient output to actuate the coil of the wiper direction relay 186. The industry standard "555" timer integrated circuit 178 followed by an operational amplifier 179 are shown, but any other oscillator capable of driving the relay 186 at the right frequency would due as well. The "555" timer 178 is hooked up in its self-triggering astable mode. The frequency of oscillation is controlled by the control switch 176, which selects one of several different capacitors. The selected capacitor and two nearby resistors establish a time constant upon which the frequency of oscillation is based. The output of the operational amplifier 179 has two states, one actuates the wiper direction relay 186 and the other state does not. The output of the operational amplifier 179 is rectified by a diode 185 to block any current during the non-actuating state.

The switching contacts of the wiper direction relay 186 are used like one or two double pole double throw (DPDT) switches, depending on whether one or two rearview mirror wiper units are being powered. The DPDT relay contacts are wired to supply power to the motor in either normal or reverse polarity depending on whether the relay 186 is actuated. One normally-closed momentary switch, 70 or 160 in FIG. 16, interrupts the power when the wiper reaches a preset point near the left side of the rearview mirror, 12 or 102, respectively. Another normally-closed momentary switch, 71 or 161 in FIG. 16, interrupts the power when the wiper reaches a preset point near the right side of the rearview mirror, 12 or 102, respectively. A second pair of switches, 70A 160A and 71A 161A in FIG. 16, do the same thing for a second rearview mirror wiper unit, if installed. The diodes 192 make sure each switch controls only the polarity of power that causes the wiper to move toward that switch. When one switch (e.g., 70) is actuated (opened), it cuts off all current flow though the motor. When the polarity reverses, the other switch (e.g., 71) and diode let the current flow in the opposite direction to move the wiper away from the open circuited switch.

The driver turns the wiper accessory on and off with DPDT power switch 177. (At the vehicle manufacturer's option, this power switch 177 may be ganged with the vehicle's front windshield wiper control so they are on or off together. Otherwise, a separate switch can be provided.) When the unit is on, power is supplied to the motor(s) through diode 180 and returned through diode 187. The diodes 180 and 187 also protect the oscillator/amplifier circuit from spikes caused by the motors and relays during normal operation. They should have a peak inverse voltage of several hundreds of volts, depending on the spike voltages actually generated. Capacitor 184 is kept in a charged state while the unit is on.

The wiper accessory may be turned off at any time, with the wiper blade at any position. When the DPDT power switch 177 is turned off, the fully charged capacitor 184 is connected into a tank circuit with the coil of relay 181 and an internal coil resistance and external resistance 182. Relay 181 is also called the off-state parking relay 181. A decaying or oscillating current appears in the circuit and actuates parking relay 181 for a short time after the power is turned off. The actuated parking relay 181 applies a bypass power to the motor(s) through the wiper direction relay 186. A diode 180 prevents this bypass power from reaching the oscillator circuit or actuating the wiper direction relay 186. This assures the bypass power always reaches the motor(s) in the same predetermined polarity, regardless of the polarity at the moment the power switch 177 was turned off. The bypass power immediately causes the wiper blade to return to a predetermined parking position. When the wiper arrives, it is stopped by a switch 71 or 161. (The optional second wiper is stopped independently by switch 71A or 171A). About one and a half seconds of bypass power is adequate for a typical motor. Therefore, capacitor 91 should be fairly large. In one test, 3300 microfarads worked with a total resistance of 550 ohms and a parking relay 181 that required 20 milliamperes to actuate.

If both left and right rear view mirrors are installed, the motors preferably should be connected opposite relative to each other so that the wipers alternate between both traveling toward the driver and both traveling away from the driver. Preferably, both mirror wipers park the wiper on the side nearest the driver. In any case, the switch or switches at the parking position of the wiper (e.g., 71 161 and 71A 161A) must each be connected to a diode 192 that is oriented so it allows current to flow when the parking relay 181 is actuated.

Alternatively, some functions of the electronic circuit 170 can be performed electromechanically. An object made to rotate at the right speed can by used to alternately make and break an electric contact, replacing the oscillator circuit 178. The output of this electric contact can drive the relay 186. If several such contacts are used they can replace the relay 186 too.

A mirror is a reflective surface. Any stiff part of the mirror is itself a mirror holder because it holds the reflective surface of the mirror. This stiff part can serve some other functions of the mirror holder, such as the runner track.

The basic rearview mirror wiper system can be provided as either original equipment on vehicle or as a make and model-specific replacement for a wiperless rearview mirror. Some additional variations of the power supply and other parts of the invention are disclosed in the parent patent application, the specification of which is included herein by reference.

The foregoing description is given by way of illustration and example. In light of this teaching, many variations and modifications will become apparent to those familiar with the art without departing from the scope and spirit of the invention. Therefore, it is intended that the scope of this invention not be limited by the foregoing description but rather by the claims appended hereto.

We claim:

1. An exterior rearview mirror wiper system for use on a vehicle, comprising:
   (a) a rearview mirror, said rearview mirror comprising a reflective surface and having top, bottom, left, and right side edges;
   (b) means for mounting said rearview mirror to said vehicle;
   (c) a pair of runner tracks mounted on said mirror, one of said runner tracks at each of two opposite edges of said rearview mirror and said pair of runner tracks being parallel;
   (d) a wiper assembly, said wiper assembly being elongated and including a flexible wiper blade or squeegee for wiping said rearview mirror and backing means for delivering substantially even pressure along said flexible wiper blade against said rearview mirror, said flexible wiper blade being attached to said backing means and said backing means having two opposite ends;
   (e) movable holding means, on each end of said two opposite ends of said backing means, for holding and pressing said wiper assembly against said rearview mirror, each said movable holding means movable engaged to one of said runner tracks;
   (f) a plurality of pulleys and an elongated flexible member threaded around said pulleys, said elongated flexible member being attached to each said movable holding means for constraining both said movable holding means to move synchronously back and forth along said runner tracks according to said elongated flexible member's movements;
   (g) bidirectional motor means;
   (h) drive pulley means for urging said elongated flexible member to move responsive to said bidirectional motor means, said drive pulley means including a drive pulley operationally connected to said bidirectional motor means and said drive pulley having frictional contact with said elongated flexible member to urge said elongated flexible member to move responsive to said bidirectional motor means and said elongated flexible member not being fixedly attached to any portion of said drive pulley;
   (i) power control means for applying electric power to said bidirectional motor means and periodically reversing the polarity of said electric power applied to said bidirectional motor means.

2. The wiper system of claim 1 wherein when said wiper system is mounted to said vehicle according to said means for mounting said rearview mirror to said vehicle, said wiper assembly is substantially vertical.

3. The wiper system of claim 1 wherein said power control means comprises: oscillator means having at least first and second output states, a relay having a coil and a plurality of electrical contacts, said coil being operationally connected to the output of said oscillator means, said first output state being sufficient to actuate said relay and said second output state not actuating said relay, and said contacts being wired to apply normal or reversed polarity electric power to said bidirectional motor means depending on whether said relay is actuated.

4. The wiper system of claim 1 additionally comprising parking means, activated when said wiper system is switched off, for applying electric power in a predetermined polarity to said bidirectional motor for a duration sufficient to cause said wiper assembly to travel to and park itself at a predetermined location.

5. The wiper system of claim 4 wherein said parking means comprises parking relay means and tank circuit means including a capacitor and the coil of said parking relay, wherein during normal operation said capacitor is charged and when power is switched off said capacitor is connected to the coil of said parking relay to complete said tank circuit and said parking relay is actuated for a sufficient time for said wiper assembly to travel to a predetermined parking position.

6. The wiper system of claim 1 additionally comprising pivot adjustment means for adjusting the rearview mirror's position in two dimensions, said pivot adjustment means including a ball and socket joint connecting said rearview mirror to said means for mounting said rearview mirror to said vehicle.

7. The wiper system of claim 1 wherein said mirror is movably mounted so it can be adjusted and said wiper system additionally comprising remote adjustment means for adjusting the rearview mirror remotely from inside the vehicle.

8. The wiper system of claim 1 additionally comprising tension means for applying a tension to said elongated flexible member.

9. The wiper system of claim 1 additionally comprising detection means for detecting the presence of said wiper assembly at each of two opposing extreme positions along said rearview mirror and for stopping further travel of said wiper assembly beyond said opposing extreme positions by removing electric power from said bidirectional motor means until the polarity of said electric power is reversed.

10. The wiper system of claim 9 wherein said detection means comprises a pair of normally-closed momentary switches and further wherein each of said switches is capable of removing the electric power to said bidirectional motor means in one polarity only.

11. The wiper system of claim 1 wherein said backing means can be detached from at least one of said movable holding means, whereby said flexible wiper blade can be accessed for replacement.

12. The wiper system of claim 1 wherein said backing means forms an integral part of both said movable holding means and further wherein said backing means includes a longitudinal slot in which the flexible wiper blade is held and in which said flexible wiper blade can slide longitudinally when manipulated to do so, and further wherein said backing means includes a hole near one end of said flexible wiper blade when said wiper blade is in a parked position, said hole being sufficiently large for said flexible wiper blade to pass though during removal and replacement of said flexible wiper blade.

13. The wiper system of claim 1 wherein said elongated flexible member is wrapped around said drive pulley a sufficient number of times for said drive pulley to grip said elongated flexible member during normal operation yet allow said elongated flexible member to slip when necessary to prevent damage to said wiper system.

14. The wiper system of claim 1 wherein said drive pulley includes a screw shaped slot disposed around the circumference of said drive pulley and wherein said elongated flexible member is wrapped around said drive pulley and rides in said screw shaped slot.

15. The wiper system of claim 1 wherein said drive pulley is a direct drive pulley and said drive pulley means includes a spur gear on said direct drive pulley and a plurality of follower spur gear drive pulleys operationally cascaded from said direct drive pulley, and further wherein said elongated flexible member is threaded back and forth among a sufficient number of said drive pulleys for said drive pulleys to grip said elongated flexible member during normal operation yet allow said elongated flexible member to slip when necessary to prevent damage to said wiper system.

* * * * *